Jan. 19, 1965   R. E. KITTREDGE   3,166,310
DOCUMENT TRANSPORT APPARATUS
Filed Nov. 30, 1962   8 Sheets-Sheet 1

FIG.1

RAYMOND E. KITTREDGE
INVENTOR

BY
ATTORNEY

Jan. 19, 1965   R. E. KITTREDGE   3,166,310
DOCUMENT TRANSPORT APPARATUS
Filed Nov. 30, 1962   8 Sheets-Sheet 3

RAYMOND E. KITTREDGE
INVENTOR

BY
ATTORNEY

Jan. 19, 1965   R. E. KITTREDGE   3,166,310
DOCUMENT TRANSPORT APPARATUS
Filed Nov. 30, 1962   8 Sheets-Sheet 6

RAYMOND E. KITTREDGE
INVENTOR

BY
ATTORNEY

FIG. 6

Jan. 19, 1965 R. E. KITTREDGE 3,166,310
DOCUMENT TRANSPORT APPARATUS
Filed Nov. 30, 1962 8 Sheets-Sheet 8

FIG. 7

RAYMOND E. KITTREDGE
INVENTOR
BY
ATTORNEY

United States Patent Office 3,166,310
Patented Jan. 19, 1965

3,166,310
DOCUMENT TRANSPORT APPARATUS
Raymond E. Kittredge, Binghamton, N.Y., assignor to General Precision, Inc., Binghamton, N.Y., a corporation of Delaware
Filed Nov. 30, 1962, Ser. No. 241,222
10 Claims. (Cl. 271—5)

This invention relates to a document transport apparatus and more particularly to a document transport apparatus for use in a character recognition system.

In several fields, a large variety of document transport mechanisms have been developed for moving a plurality of documents from station to station within a machine system. However, it has generally been true for all the mechanisms of the prior art, that the characteristics of each of the plurality of documents must be controlled to exacting tolerances, and, further documents acceptable for one system are inoperable in other systems. By way of example, in the well known data processing field, the punched cards used therein have dimensions as specified by the manufacturer of the particular machine, and any card that either does not meet the specified dimensions or is bent, wrinkled, or otherwise mutilated will be rejected by the machine.

However, in a general purpose character recognition system, that is, a system which converts human intelligible language into machine intelligible language, such exacting tolerances of the document characteristics are neither desirable nor possible. This results from the fact that the documents originate from several sources, are provided in varying formats depending on the type and the amount of information contained thereon, and can be subjected to several processing operations prior to delivery to the character recognition system, resulting in one or more mutilated documents.

Therefore, according to the invention, there is provided an improved document transport apparatus which accepts a plurality of documents of varied characteristics, feeds them individually to the read station of a character recognition system, and thereafter delivers the documents to one or more output bins. Briefly, a plurality of documents are piled one on top of another in a hopper to form a stack, the documents being randomly intermixed as to dimensions and thickness over pre-determined limits determined by the read station as will be understood as the description proceeds. It is necessary, however, that all of the documents be of about the same dimension in a direction perpendicular to the direction of document travel through the apparatus of the invention in order to ensure that only a single document is processed at a time. Generally, when the apparatus is employed as a unit of a character recognition system, documents are transported to the read station with the lengthwise dimension perpendicular to the direction of travel thereof, and it is therefore required that all documents be of about the same length, as hereinafter described. It should be noted, however, that stacks of other lengths, including documents randomly intermixed as to width and thickness, can also be accommodated provided only that each stack includes documents of substantially uniform length. Next, vacuum means are selectively operable to remove a single document from the hopper and cause it to be transported to a paper stop and alignment station. From this station, the document is delivered to a rotating read drum to which the document is then securely attached by mechanical and vacuum means. Finally, under control of the character recognition system, the next document is selected from the hopper and the original document is removed from the read drum and forwarded to a predetermined output bin.

It is an object of the invention to provide an improved document transport apparatus.

Another object of the invention is to provide a transport apparatus for documents exhibiting variable characteristics.

A further object of the invention is to provide a document transport apparatus for a character recognition system.

Still another object of the invention is to provide a transport apparatus for documents of variable width and thickness in a character recognition system.

A related object of the invention is to provide improved vacuum feed means for a rotating read drum in a character recognition system.

Yet another object of the invention is to provide an improved vacuum feed means in a document transport apparatus.

These and other objects, features, and advantages of the invention will be apparent from the following detailed description of a preferred embodiment thereof as illustrated in the following drawings.

Figure 1:
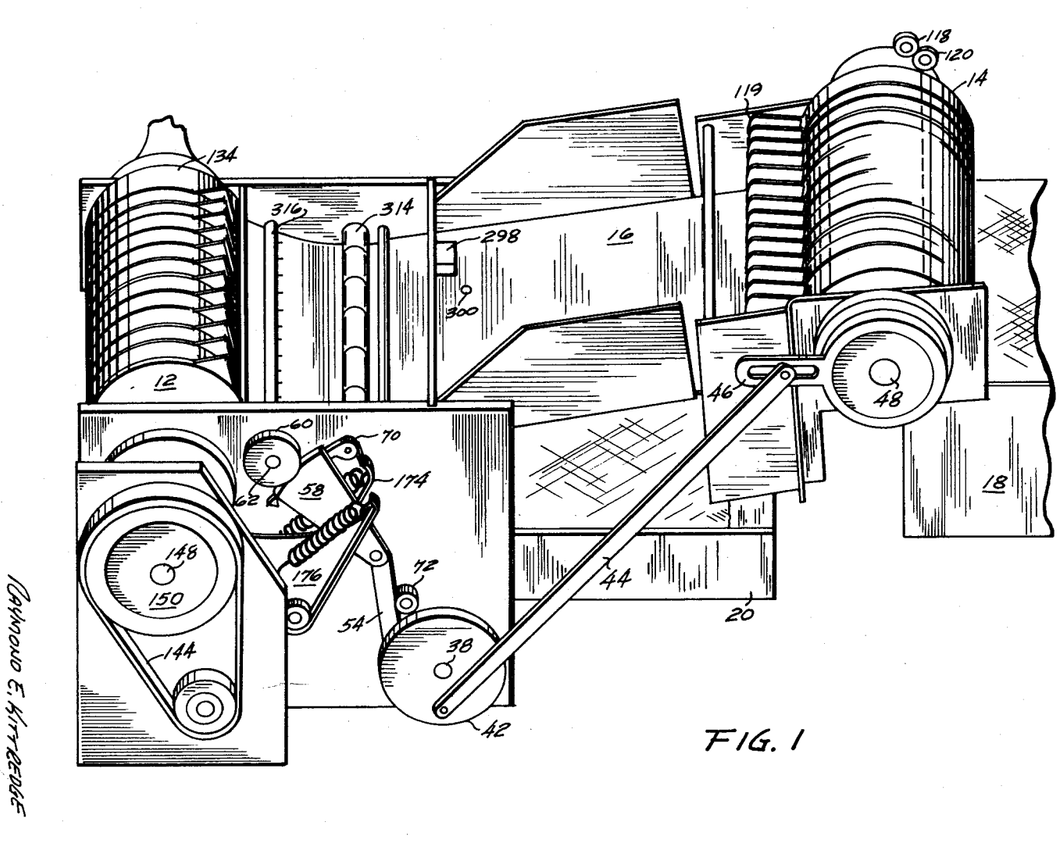
FIG. 1 is a pictorial view of a preferred embodiment of the apparatus of the invention.

Referring now to the drawings, FIG. 1 is a side view of a preferred embodiment of the apparatus of the invention. As there shown, the apparatus 10 includes a read drum 12 and a feed drum 14 separated by an inclined transport plate 16. Since the character recognition system per se forms no part of the present invention it will neither be shown nor described herein, it being understood by those skilled in the art, that the optical and illumination systems, by way of example, which comprise a portion of the input stage of such systems are normally positioned adjacent a surface of drum 12. Further shown in FIG. 1 is an input hopper 18 and an output bin 20. Although only a single output bin is illustrated, it is apparent that a plurality of output bins could be employed, if desired, with the character recognition system controlling the bin to which a document is directed towards after leaving read drum 12. Various portions of the drive systems for the feed and read drums are also shown in FIG. 1, but for a more complete understanding of the apparatus of the invention, the principal elements of the apparatus will first be described in detail before discussing the operation of the complete system as a unit.

Figure 2:
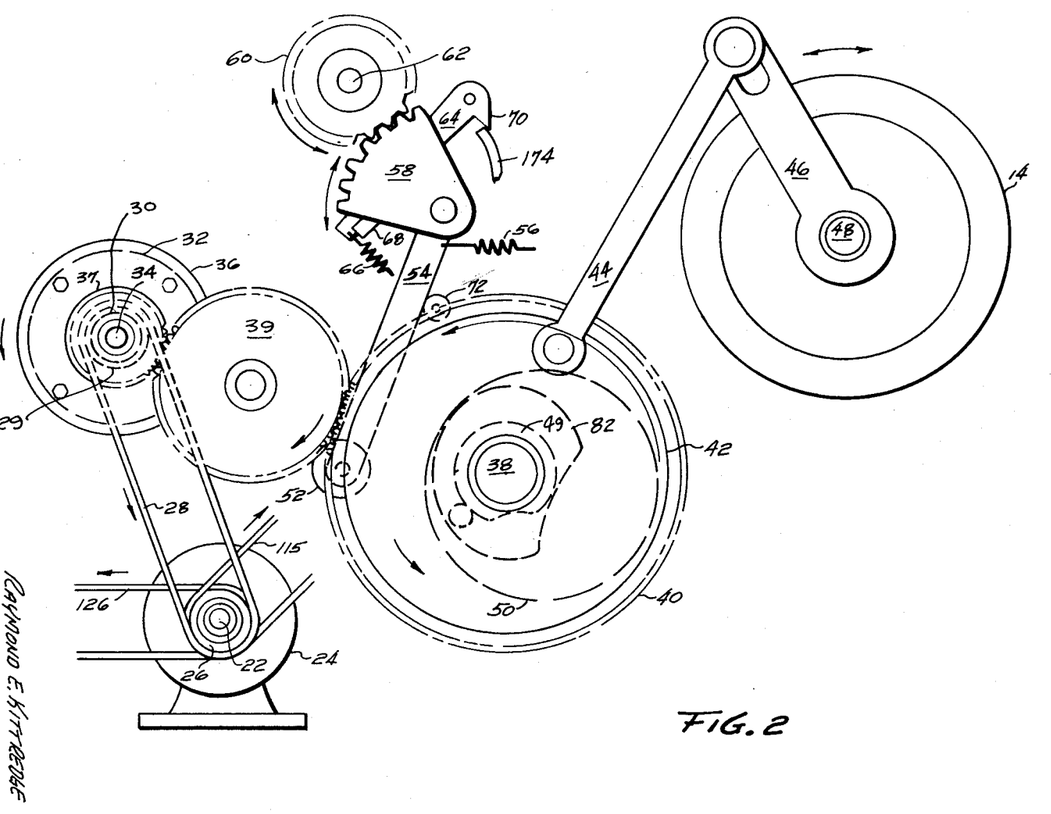
FIG. 2 is a pictorial view of the drive mechanism of the feed drum of the apparatus shown in FIG. 1.

Referring now to FIG. 2, there is illustrated in pictorial form the drive mechanism of that portion of the apparatus which is effective to deliver a single document from the stack to a paper stop and aligner, prior to the document being placed on the read drum. As there shown, rotary motion is continuously supplied to a shaft 22 from a main driving means 24, such as a constant speed A.C. motor or the like. Secured to shaft 22 is a triple pulley 26 which couples the rotary motion of shaft 22 to belts 28, 115, and 126, the latter two being hereinafter further described in conjunction with FIGS. 3A and 4A, respectively. Belt 28 is coupled to a pulley 29 rigidly secured to a shaft 30 to supply continuous rotary motion thereto. Coupled to shaft 30 is an electromagnetic clutch 32 which is selectively energized as necessary under control of the overall system as more particularly hereinafter explained. Energization of clutch 32 is effective to couple the rotary motion provided by the main driving means and shaft 30 to a further shaft 34 about which is positioned an electromagnetic brake 36. Clutch 32 and brake 36 are energized 180° out of phase as will be understood by those skilled in the art, i.e., brake 36 is deenergized when clutch 32 is energized and brake 36 is energized simultaneously with the deenergization of clutch 32. In this manner the timing and amount of rotation of shaft 34 is accurately controlled.

Upon the energization of clutch 32 and the deenergization of brake 36, rotary motion is imparted to yet another shaft 38 by means of a gear train comprising a gear 37 secured to shaft 34, an idler gear 39, and a gear 40 affixed to shaft 38. It should be noted that this gear train provides a reduction in the speed of rotation of shaft 38 with respect to shaft 34, which, in the preferred embodiment being described is in the ratio of 1 to 3. This is effected, since it is necessary that shaft 38 rotate at machine speed, that is, each revolution of shaft 38 corresponds to one cycle of machine operation, yet more efficient brake and clutch operations are obtained at somewhat higher rotational speed. Secured to shaft 38 is a drive wheel 42 having a crank 44 pivotally mounted at an outer radial point thereof. The upper end portion of crank 44 is linked to a drive member 46 which is rigidly secured to drive shaft 48 of feed drum 14. By this crank and linkage arrangement, oscillatory motion is imparted to drum 14 with each complete revolution of drive wheel 42. Further, a cam 49 is also attached to shaft 38, the function of which is hereinafter described in conjunction with the description of electrical system of the apparatus.

Also secured to shaft 38 is a cam 50, which upon rotation of shaft 38, imparts combined transverse-vertical motion to a cam follower 52, rotatably mounted to a lever arm 54. Arm 54, maintained under tension by a spring 56, is pivotally connected to a drive member 58, the upper portion of which meshes with a gear 60 pinned to a shaft 62, upon which the paper stops are positioned as will be understood as the description proceeds. Adjacent drive member 58 is a latching mechanism 64, maintained under tension by a spring 66, operable to engage an arm 68 mounted on drive member 58 in order to maintain drive member 58 latched in the position shown until such time as the paper stops are to be released, as will be understood as the description proceeds. A release mechanism 70 is provided to trip latching mechanism 64 and release the linkage assembly comprising drive member 58 and lever arm 54 to the normal at rest position to thereby provide counterclockwise rotation to gear 60 and shaft 62 and release the paper stops. A stop 72 is also provided to limit the transverse motion of lever arm 54. By this arrangement, cam 50 is effective to impart a predetermined clockwise angular rotation to shaft 62 to restore the paper stops at the start of a feed operation, which rotation is maintained until such time as the next document is supplied to drum 12 as hereinafter explained.

Figures 3A, 3B, 3C:
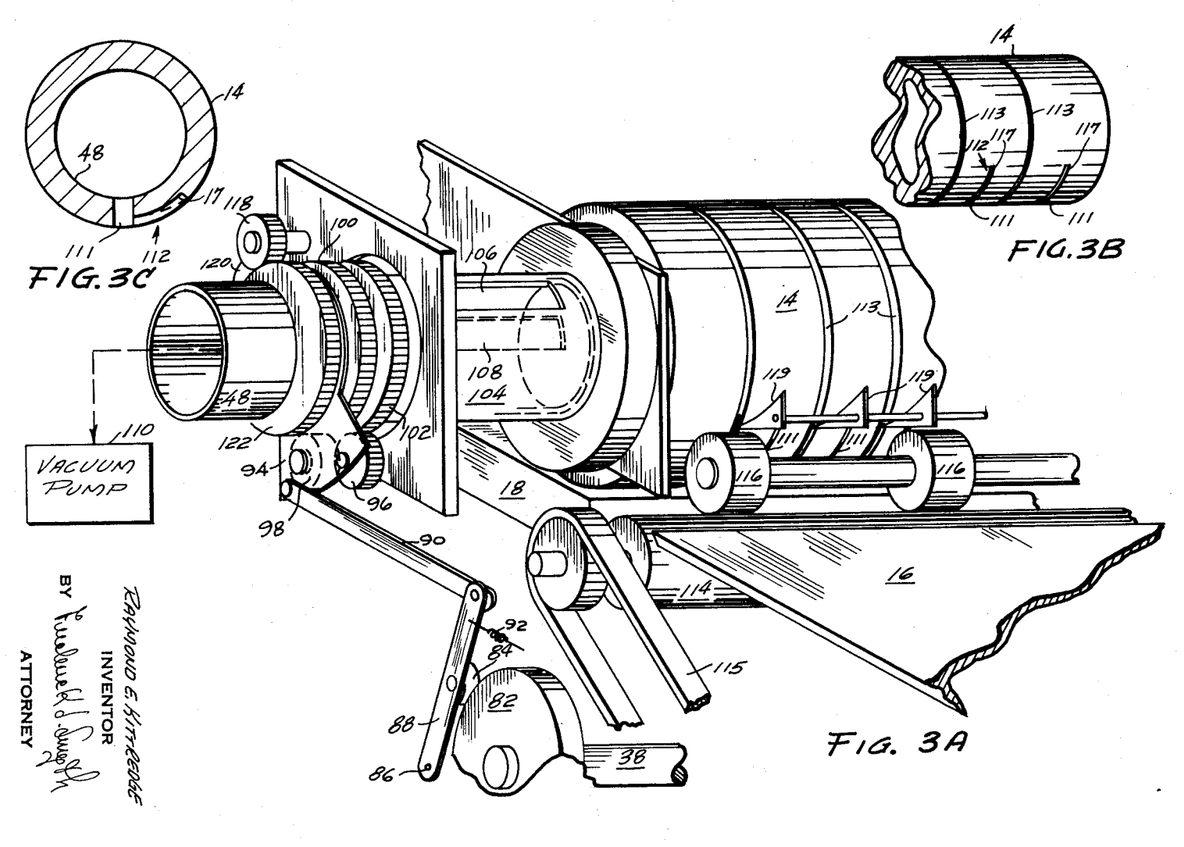
FIGS. 3A and 3B together are a pictorial view of the vacuum supply system of the feed drum of the apparatus shown in FIG. 1.
FIG. 3C is a cross section of the vacuum supply system of the feed drum of the apparatus shown in FIG. 3B.

Turning now to FIG. 3A, there is illustrated therein the vacuum supply system for feed drum 14. As stated above with reference to FIG. 2, oscillatory motion is supplied to feed drum 14 whereby, with relation to FIG. 3, drum 14 first rotates clockwise and thereafter counterclockwise during each cycle of operation. In conjunction with this motion, a vacuum system is selectively coupled to the feed drum during a predetermined increment of each cycle of operation in order to select a single document from input hopper 18 and commence its transport through the remaining portions of the apparatus.

As stated above with respect to FIG. 2, a paper feed cycle is initiated by energization of clutch 32 and the simultaneous deenergization of brake 36, to thereby impart rotary motion to shaft 38. As now shown in FIG. 3, a cam driver 82 is also secured to shaft 38. Linear displacement provided by cam 82 is coupled by a cam follower 84 to a linkage system pivotally mounted at 86 which comprises a pair of arms 88 and 90 and a spring 92. Arm 90 is attached to a drive member 94 and is effective to impart transverse motion to a first differential consisting of a pair of intercoupled gears 96 and 98. Gear 98 also meshes with a transmission gear 100 and gear 96 also meshes with a gear 102 which is rigidly secured to movable member 104, the latter comprising one-half of the vacuum valve means for paper feed drum 14.

In operation, as drum 14 is initially rotated in the clockwise direction, an opening 106, located in drive member 104, is vertically aligned with a further opening 108 located in paper feed drum shaft 48. In this manner, a source of vacuum, such as a vacuum pump 110 or the like, coupled to shaft 48 is connected to atmosphere by means of openings 106 and 108 and no document motion is possible at this time. Next, just prior to the conclusion of the clockwise rotation of drum 14, cam 84 is effective, through the illustrated mechanical linkage arrangement, to rotate member 104 to the position shown in FIG. 3A, whereby opening 108 is effectively sealed from opening 106. At this time therefore, the force excited by vacuum pump 10 is coupled to a plurality of spaced apart slots 112 located in feed drum 14. As shown more particularly in FIG. 3B, each slot 112 comprises an aperture 111 which extends through drum 14 and connects with the inner radius of shaft 48, coupled with a lengthwise recessed portion 117 which does not extend completely through drum 14. In this manner, apertures 111 are first effective to attract a document to drum 14, whereby the document covers apertures 111, and the vacuum force exerted by pump 110 is distributed along the length of portions 117 to ensure the document is securely restrained in contact with drum 14. Thus, the vacuum force supplied through slots 112 is effective to remove the uppermost document from hopper 18 and securely attach it to drum 14. In general, satisfactory results are obtained with recessed portions 117 having a uniform depth throughout its length. However, more positive control results from tapering recessed portions 117. As shown by the dashed line in FIG. 3C, by way of example, the depth of portion 117 varies inversely as the distance from aperture 111, to maintain substantially uniform vacuum pressure applied to a document throughout the length of portion 117. Of course, other and different tapers could be substituted as desired.

Continuing, drum 14 is next rotated in the counterclockwise direction to deliver the selected document, in conjunction with a plurality of fixed stripper knives 119, between a continuously rotating roller 114, coupled to the main driving shaft 22 by belt 115 (see FIG. 1), and a number of driven roller wheels 116, which together transport the document along inclined transport plate 16 to the paper stop and alignment station as hereinafter described. Cam 82 is so shaped, that, when the document is positively engaged by roller 114 and wheels 116, member 104 is rotated to again align openings 106 and 108 to thereby release the document from drum 14. Finally it should be noted that as a result of the rotation of drum 14 during the time opening 106 and 108 are spaced as shown in FIG. 3A, a second differential is employed to maintain this spacing constant. This second differential includes a second pair of intercoupled gears 118 and 120, the first of which, 118, also meshes with a gear 122 rigidly secured to shaft 48, and the second of which, 120, also meshes with transmission gear 100. In this manner, motion originated by either cam 82, or, alternatively, shaft 48, is transmitted to member 104 to maintain a predetermined spacing between openings 106 and 108. One document is transported to the alignment station for each operational cycle of feed drum 14.

Figures 4A, 5:
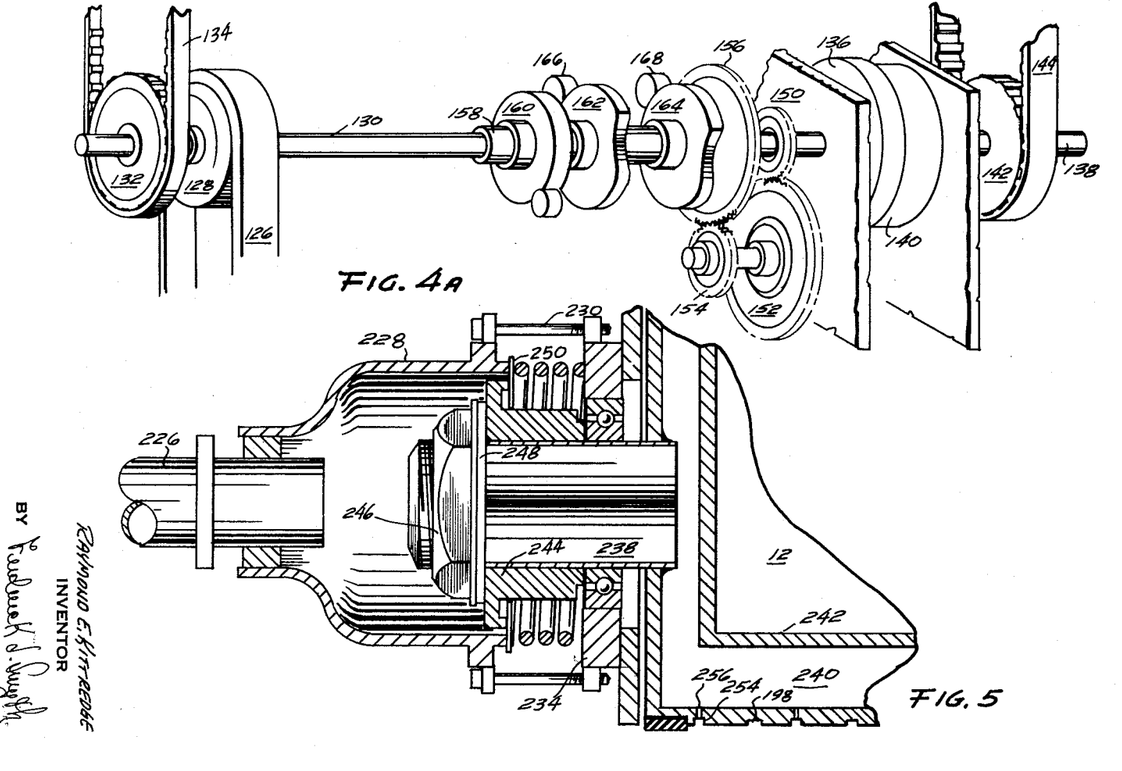
FIGS. 4A through 4D together are a pictorial view of the drive mechanism of the read drum of the apparatus of FIG. 1.
FIG. 5 is a pictorial view of the vacuum supply system of the read drum of the apparatus shown in FIG. 1.

Referring now to FIG. 4A, there is illustrated a first portion of the drive system associated with read drum 12. Continuous high speed rotary motion is coupled to shaft 130 from shaft 22 by means of belt 126 (see FIG. 1) cooperating with a pulley 128 fixedly mounted on shaft 130. A gear-type pulley 132, also secured to shaft 130, is engaged by a timing belt 134 which is also looped over one end portion of read drum 12 (see FIG. 4B). In accordance with the ratio of diameter of pulley 132 and drum 12, the rotational speed of the drum is reduced with respect to that of shaft 130, so that each revolution of drum 12 also corresponds to one machine cycle, as will be further understood as the description proceeds. Shaft 130 terminates in a section of an electromagnetic clutch 136, the other section of which is coupled to a shaft 138, whose rotation is further controlled by an electromagnetic brake 140. Again clutch 136 and brake 140 are selectively operated 180° out of phase in order to ensure that the timing and amount of rotation of shaft 138 is accurately controlled. Secured to shaft 138 is a gear-type pulley 142, which, together with a timing belt 144, delivers selective rotary motion to a control shaft 146 through a gear-type pulley 148 affixed thereto (see FIG. 4B). Again, the diameters of pulleys 142 and 146 are so selected that one revolution of shaft 146 corresponds to one machine cycle.

Also secure dto shaft 130 is a gear 150 which forms one element of a conventional speed reduction unit which additionally includes gears 152, 154, and 156. Gear 156 is pinned to a shaft 158, which is concentrically positioned about shaft 130. Further, shaft 158 is caused to rotate once each machine cycle as a result of the speed reduction obtained by means of gears 150, 152, 154, and 156. Shaft 158 provides the necessary rotary motion for a group of cams 160, 162, and 164. Cam 160 is effective to generate a system timing input pulse to the electrical portion of the apparatus and is more particularly described hereinafter in conjunction with FIG. 8. Cams 162 and 164, together with their associated follower arms 166 and 168, respectively, are operable during a document interchange operation, that is, the time interval during which one document is removed from the read drum and the next document is placed thereon, as will be better understood as the description proceeds.

Figure 4B:
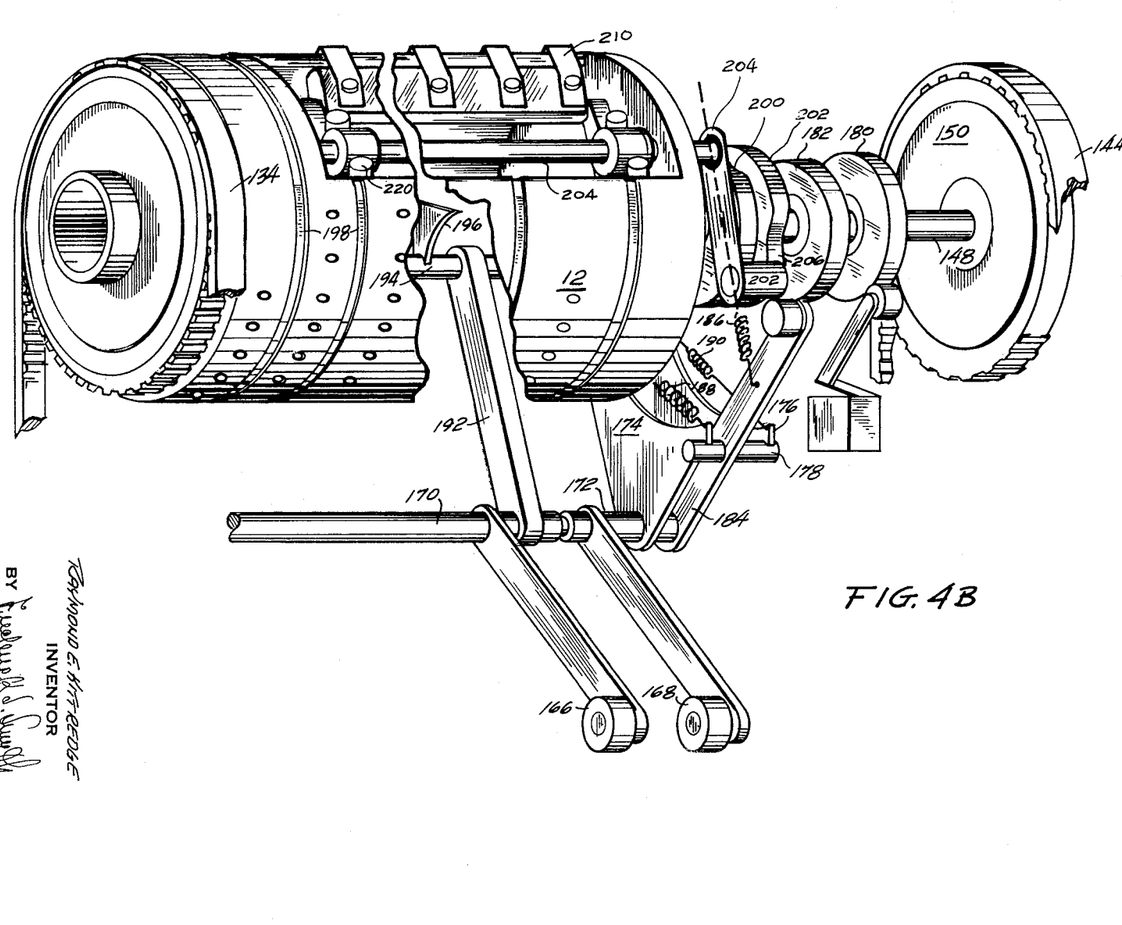

Referring now to FIG. 4B, there is illustrated a pictorial representation of a further portion of the drive system of read drum 12. Follower arms 166 and 168, also shown in FIG. 4A, are secured to a pair of concentrically located shafts 170 and 172 which terminate in arms 174 and 176, respectively. Arms 174 and 176 are each effectively biased, except during a paper interchange operation, by a rod 178 to maintain follower arms 166 and 168 out of contact with their respective cams 162 and 164. Thus, during the time interval a document is secured to drum 12 by the combination of mechanical and vacuum means, continuously rotating cams 162 and 164 have no effect on the operation of the apparatus.

Upon the initiation of a document change by the energization of clutch 136 and the deenergization of brake 140, one revolution of control shaft 148 is provided thereby as described below. Secured to shaft 148 is a first cam 180 which is effective to supply an input signal to the electrical portion of the apparatus, and the description thereof is deferred until the entire detailed description of this system taken in conjunction with FIG. 6.

Also secured to control shaft 148 is a cam 182 effective to impart downward motion to a follower arm 184, which is normally upwardly biased by a spring member 186. As can be seen in FIG. 4B, rod 178 is positioned by means of follower arm 184, and the downward movement of the latter, resulting from the rotation of cam 182, is effective to release the bias previously applied to arms 174 and 176 and, further, by means of a pair of springs 188 and 190, each of which has one end attached to rod 178 and the other end fastened to an upper portion of arms 174 and 176, respectively, arms 174 and 176 are rotated clockwise until follower arms 166 and 168, coupled thereto through concentric shafts 170 and 172, contact the outer surface of their respective cams 162 and 164 (see FIG. 4A). In this manner, cams 162 and 164 are activated during a document interchange operation.

Next, during a portion of the document interchange operation, a depression in cam 162 is sensed by follower arm 166, as a result of the tension supplied by spring 188, to impart a predetermined amount of clockwise rotation to shaft 170. As shown in FIG. 4B, a linking arm 192 secured to shaft 170 couples this motion to a transverse shaft 194 upon which are affixed a number of stripper fingers 196. Upon transmittal of the motion provided by follower arm 166 each of the stripper fingers 196 engages a corresponding slot 198 in drum 12 and are thereby effective to remove the leading edge of the document attached to read drum 12, which at this time is maintained in contact with the outer surface of drum 12 solely by the vacuum means, the mechanical means having previously been disengaged as will be better understood as the description proceeds. After a predetermined time interval, stripper fingers 196 are restored to the initial at rest position.

In similar manner, during a later portion of the document interchange operation, a depression in cam 164 is sensed by follower arm 168, as a result of the tension supplied by spring 190, to impart a predetermined amount of clockwise rotation to shaft 172. Arm 174 secured to this shaft is also caused to rotate clockwise and the upper portion thereof (see FIG. 1) engages release mechanism 70 of latch 60 (see FIG. 2) to release drive member 58, which, responsive to spring 56, imparts clockwise motion to shaft 62 through gear 60. This rotation of shaft 62, to which the document stops 116 are fastened (see FIG. 1) permits the next document to be released to read drum 12 as more fully hereinafter discussed.

Returning now to shaft 148, as shown in FIG. 4B, also secured thereto is a further cam 200. This cam is normally positioned during a read operation, that is, the time interval during which a document is maintained on drum 12 for a number of revolutions thereof, in the position shown whereby the associated follower 202 and a shaft 204 are prevented from sensing the dwell portion of a parallelly positioned fixed cam 206, secured to a bracket or the like (not shown). During a document interchange operation, however, cam 200 now rotated by control shaft 148 at the same speed as drum 12 to which follower 202 is secured, provides a dwell portion adjacent and synchronized with follower 202 so that follower 202 during the interchange operation now senses the dwell portion of fixed cam 206, whereby the motion of follower 202 is determined solely by cam 206. Follower 202 together with shaft 204 are thereby effective, as will be better understood next in conjunction with the description of FIGS. 4C and 4D, to first release the mechanical gripper fingers associated with drum 12, which operate to maintain the leading edge of a document in contact with drum 12, to allow the document mounted on drum 12 to be removed, and thereafter restore the grippers to their original position in order to maintain the leading edge of the next document firmly attached to drum 12. Thus, it has been shown that a document interchange operation is controlled by a single revolution of control shaft 148 which is operated at the same speed as that of drum 12.

Figure 4C:
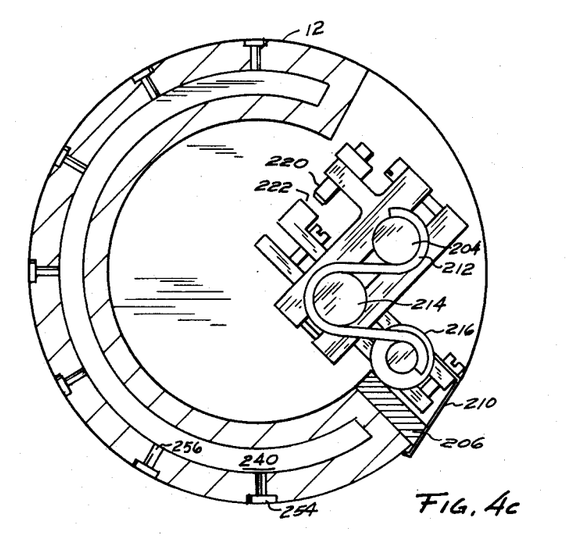
Figure 4D:
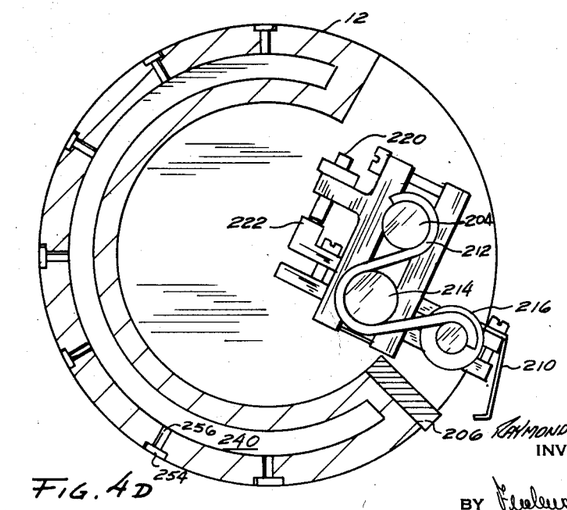

Referring now to FIGS. 4C and 4D, there is illustrated in pictorial form the remaining portion of the drive system of read drum 12, and, more particularly, there is illustrated the novel operation of the mechanical gripper fingers. Specifically, FIG. 4C is a side cross-sectional view of drum 12 showing the grippers closed, and FIG.

4D is a similar side cross-sectional view showing the grippers released. To ensure that a document remains in precise alignment with a drum document stop 206, the grippers are not merely pivoted about a central pivot point in the conventional manner, but rather are impressed with a pair of motions. The first, during the release of a document, is a substantially perpendicular motion away from the drum surface, and, thereafter, the second is the conventional pivotal movement. As the grippers are closed this motion order is reversed. Thus, as the grippers grasp the leading edge of a document through vertical movement only, the alignment of the document with respect to stop 206 is not disturbed.

These motions are obtained by means of counterclockwise rotation of shaft 204 pinned to a lever 208. The action of lever 208 tends to impart pivotal movement to the gripper fingers 210, but as a result of the force exerted by spring 212, positioned about a hub 214 and terminating about shaft 204, upon roller 216, perpendicular motion only is imparted to the gripper fingers at this time. This results from the fact that roller 216 is secured to the same member 218 to which the grippers are attached, and at this time, spring 212 is exerting essentially a tangential force upon roller 216. Thus, the initial rotation of shaft 204, together with spring 212, maintains roller 216 in contact with the vertical surface of drum stop 206, and lever 208 is thereby effective to cause vertical movement of grippers 210. With further rotation of shaft 204, however, an adjustable screw member 220 contacts a limit stop 222, thereby causing pivotal rotation of grippers 210 about hub 214. Finally, clockwise rotation of shaft 204 results in the reverse sequence of these motions to restore the grippers to the normally closed position.

For the reasons that read drum 12 is continually rotating during machine operation and vacuum means are employed in combination with mechanical means to ensure that the document being read is securely maintained in contact with the outer surface of drum 12, a rotary vacuum seal is required to couple a vacuum source to the read drum. The simple, yet reliable, rotary vacuum seal employed in the preferred embodiment of the invention described herein is illustrated in FIG. 5. As there shown, tube 226, one end of which is connected to vacuum pump 110 (see FIG. 3) terminates in a housing member 228, secured to a portion of the main machine frame by a pair of bolt like members 230 and 232 and a bracket 234. Positioned within bracket 234 is a bearing 236 which permits a tubular coupling member 238 to revolve with respect to the main frame. Coupling member 238 is effective to connect the vacuum chamber 240 of read drum 12, formed by the inner surface of drum 12 and the outer surface of a retaining wall 242, to the inner volume of housing member 228, and thus ultimately to vacuum pump 110. One end of coupling member 238 is weldably attached to drum 12 and the other end thereof is maintained in contact with a rotatable first member 244 of the vacuum seal by means of an adjustable nut 246 and a washer 248. The second member of the seal comprises a gasket 250 of nylon, Teflon, or the like, which is maintained in an abutting relationship with member 244 both as a result of the force excited by a spring 252 as well as the force of the pressure differential existing thereacross. Thus, there has been shown and described a simple, reliable, relatively maintenance free rotary vacuum seal.

Additionally, note should be made of the novel vacuum means employed to retain a document upon the surface of drum 12, which is operable without altering the suction pressure obtained from the vacuum pump as a function of document length. This desirable feature is attained by means of a plurality of compound openings in read drum 12 between the outer surface thereof and vacuum chamber 240. As shown in FIG. 5, each of these openings includes a cuplike portion 254 and a narrow orifice 256. Thus, any of the openings covered by a document exerts the full vacuum pressure over an area determined by the diameter of portion 254, yet any opening not covered by a document provides a leak to atmosphere pressure as determined by the diameter of orifice 256. Since the diameter of portion 254 is relatively large as compared to the diameter of orifice 256, each of the openings is automatically operable to provide either maximum document holding force or, alternatively, minimum leakage rate.

Figure 6:
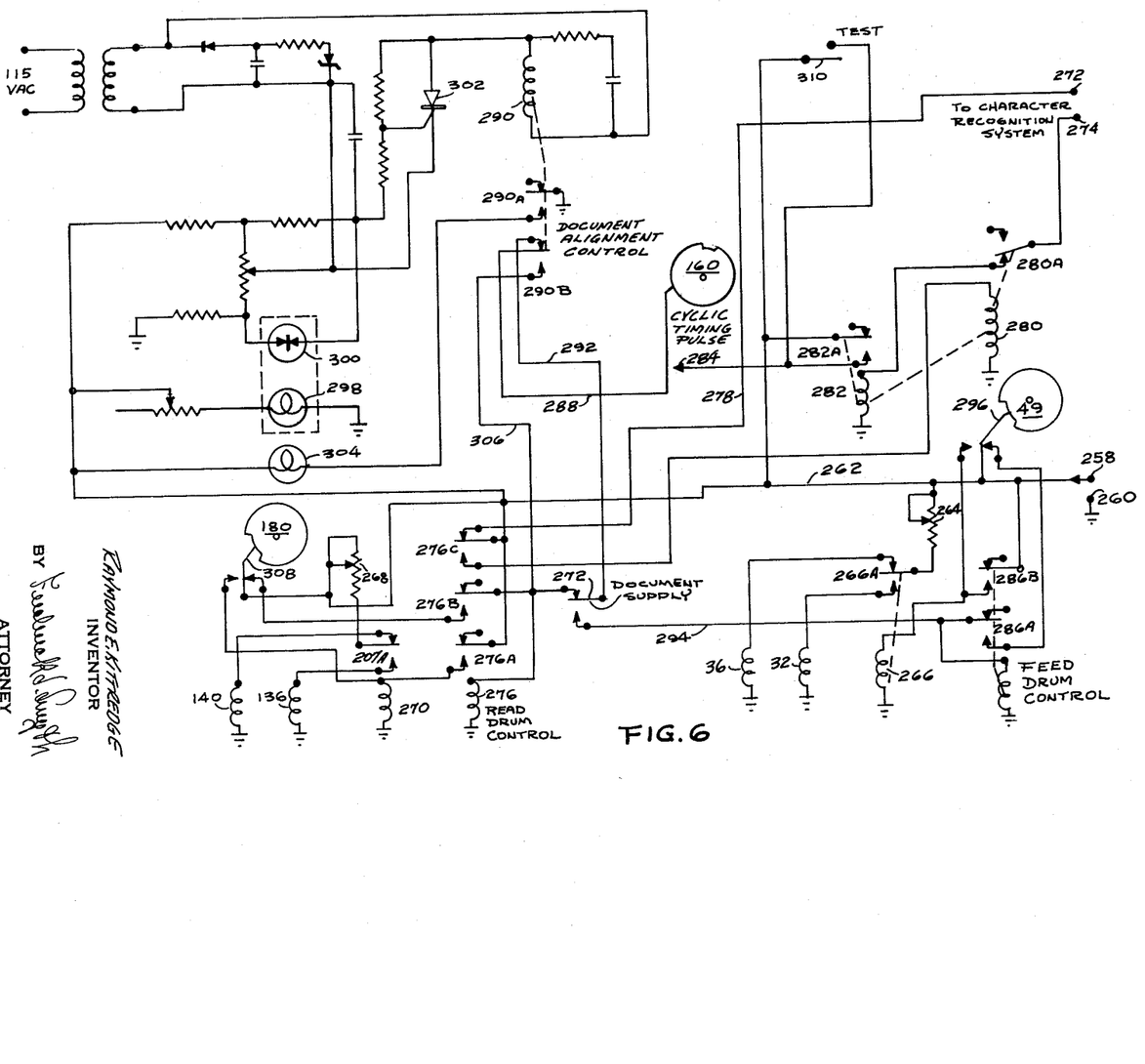
FIG. 6 is an electrical schematic diagram of the apparatus of FIG. 1.

Turning now to FIG. 6, there is illustrated the electrical portion of the system in schematic form. In the drawing, all of the various switches and relays are shown in the normal position prior to machine operation. At this time, the main power source coupled to terminals 258 and 260 is effected to energize brake 36 along a portion of line 262, through adjustable potentiometer 264, and the normally closed contact 266A of relay 266. In similar fashion, brake 140 is also energized by means of line 262, an adjustable potentiometer 268 and the normally closed contact 270A of relay 270. Next, a supply of documents is positioned in hopper 18 resulting in the transfer of document supply switch 272 from the position shown.

The feeding of a document from the hopper first to the alignment station and then to the read drum is under control of the character recognition system, or other equipment, external to the apparatus of the present invention, and an end of read signal, signifying that a document interchange operation should commence, is generally indicated by the application of a pulse to the electrical system shown in FIG. 6. However, as an aid in understanding the operation of the circuit of FIG. 6, the end of read signal will be indicated by a conductive path between terminals 272 and 274, resulting from the operation of a switch or relay means, it being understood that a pulse signal applied to terminal 274 would function as well.

The application of an end of read signal, which is effective to electrically connect terminal 272 to terminal 274, results in relay 282 being picked, through line 262, normally closed contact 276C of relay 276, a line 278, terminals 272 and 274, closed contact 280A of relay 280 and the coil of relay 282. Relays 280 and 282 are interdependent mechanical latching relays and the picking of either results in the transfer of both sets of contacts, that is contacts 280A and 282A. The transfer of 280A inhibits the application of additional end of read signals during the following sequence of operations and the transfer of 282A applied the main power to the normally open contact of timing switch 284, the operation of which is controlled by continuously rotating cam 160 secured to shaft 158 (see FIG. 4A). Cam 160, which rotates once each machine cycle, is effective to close switch 284 at approximately 235° of the machine cycle, and, at this time, to pick feed drum control relay 286 to start a paper feed operation. This occurs by means of the main power being momentarily coupled to line 288 through the now closed switch 284, along line 288 through the normally closed contact 290B of relay 290, line 292, the transferred contacts of document supply switch 272, line 294, and the coil of feed drum control relay 286. The actuation of relay 286 is effective first to maintain coil 286 energized through the transfer of contacts 286A and the normally closed contact of a switch 296 and also to energize relay 266 through contact 286B. The energization of relay 266 is effective to deenergize brake 36 and simultaneously energize clutch 32 to initiate the rotation of shaft 38, as above described, by means of the transfer of contact 266A. At this time, cam 49, also secured to shaft 38 commences one cycle of rotation, and this cam controls the transfer of switch 296, which is of the make before break type, and momentarily holds relay 286 for a short time interval to ensure that shaft 38 is rotating and thereafter releases relay 286 and solely applied the main power source to relay 266 through its normally open contact until cam 49 has completed one revolution at which time relay 266 is deenergized by the transfer of switch 296, and at this time relay 286 cannot again be picked provided that a document has been delivered from hopper 18 to the paper stop and alignment station. Relay 266 is deenergized by the return of switch 296 to its normally closed position and the presence of a document at the alignment station interrupts the light from a source 298 normally incident upon a photodetector 300. The removal of light from detector 300 changes the impedance thereof which change is sensed and amplified by a switching transistor 302 to actuate relay 290, thereby preventing the energization of relay 286 by the now transferred contact 290B. Further, the transfer of contact 290A supplies power to indicator light 304 to indicate the presence of a document at the alignment station.

At this time, the next closure of switch 284, controlled by cam 160, applies the main power to line 288, through transferred contact 290B, along line 306, to relay 276 to begin a document interchange operation. The activation of relay 276 is effective first to maintain coil 276 energized through the transfer of contact 276B and the normally closed contact of a switch 308 and also to energize relay 270 through contact 276A. The energization of relay 270 is effective to deenergize brake 140 and simultaneously energize clutch 136 to initiate the rotation of shaft 138, as above described, by means of the transfer of contact 270A. At this time, cam 180, also secured to shaft 148, commences one cycle of rotation, and this cam controls the transfer of switch 308, which is of the make before break type, and momentarily holds relay 276 for a short time interval to ensure that shaft 138 is rotating and thereafter releases relay 276 and solely applies the main power supply to relay 270 through its normally open contact until cam 180 has completed one revolution at which time relay 270 is deenergized by the transfer of switch 308, and at this time relay 276 cannot again be picked provided that the document previously at the alignment station is now secured to the read drum. Relay 270 is deenergized by the return of switch 308 to its normally closed position and the absence of a document at the alignment station allows the light from source 298 to again impinge upon detector 300 returning relay 290 to the position shown in FIG. 6, thereby removing line 306 from the main power source and preventing the energization of relay 276.

It should also be noted that contact 276C, which also is transferred at the commencement of a document interchange operation, is effective to energize relay 280 and thereby return contacts 280A and 282A to the position shown in FIG. 6, to prevent switch 284, controlled by continuously rotating cam 160, from thereafter picking either feed drum control relay 286 or read drum control relay 276. In this manner, document transfer is suspended until such time as the next end of read signal appears and picks relay 282, at which time the above described cycle of operations is repeated.

Note also should be made of the fact that upon exhaustion of the supply of documents in hopper 18, document supply switch 272 is returned to the position shown in FIG. 6 so that the next end of read signal is not effective to pick feed drum control relay 286, but rather is applied to read drum control relay 276 to thereby initiate a document interchange operation and remove the last document from read drum 12. Finally, it can be seen that test switch 310 is effective to operate as an end of read signal allowing switch 284 to pick either of the drum control relays 276 or 286, depending upon the state of relay 290, for maintenance purposes.

It is believed that the operation of the apparatus of the present invention should now be obvious, but to complete this specification, a cycle of operations will next be described in detail, reference being made as necessary to the drawings described above in detail taken together with FIG. 1 which illustrates the basic document path through the apparatus and FIG. 7 which represents the timing diagram of the major units in the apparatus.

Initially, a supply of documents is placed in hopper 18. As a result of the fact that the above described vacuum feed means is employed to remove the documents from the hopper, it is required that each of the documents be of nearly equal lengthwise dimension to ensure that only a single document is removed by the vacuum means at any one time. If variable length documents are positioned in the hopper, the vacuum operated feed means will remove not only the top narrow document but also that portion of the next under document exposed by the narrow document. Of course, a number of stacks can be serially supplied to the hopper provided only that all of the documents in each stack are of the same length. However, the documents can be, and usually are, of intermixed width, limited only by the fact that the width of the widest document cannot exceed the surface length of read drum 12. Again, the weight of the document is immaterial provided only that the document is sufficiently flexible to adhere to the outer surface of read drum 12.

Figure 7:
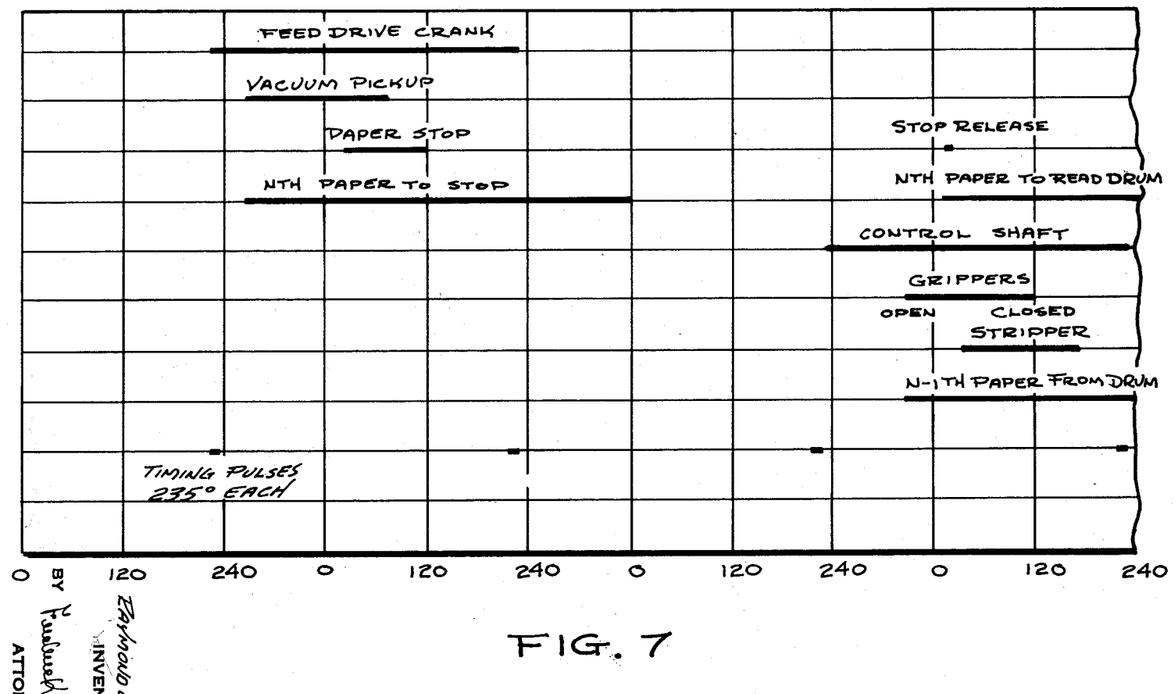
FIG. 7 is simplified timing diagram of the apparatus shown in FIG. 1.

Upon the sensing of an end of read signal, shaft 38 (see FIG. 2) commences to rotate at 235° of the next machine cycle as shown in FIG. 7 and by means of the mechanical linkage shown in FIG. 2 imparts oscillatory motion to read drum 14, operates to set the paper stops 316 secured to shaft 62, as well as operating the vacuum means shown in FIG. 3. In this manner, a document is first removed from hopper 18 by the vacuum pressure exerted through slots 112 in feed drum 14 which attaches the document to the drum, thereafter removed from the drum by stripper 119 and driven by rollers 114 and 312 together with idler wheels 116 and 314, respectively, along transport plate 16 to the paper stops 316. Front edge alignment of the document is provided by the continued force exerted by roller 312 and idler wheels 314 (see FIG. 1) maintaining the entire front edge of the document in contact with all of the stops 316.

It should be noted, as shown in FIG. 7, that the second timing pulse is ineffective in the document transport operation, for the reason that the document has, at this time, not interrupted the light from source 298 incident upon detector 300 to thereby cause the transfer of relay 290. This condition is merely arbitrary, however, and it should be understood that the second timing pulse could be, if desired, effective to initiate a document interchange operation or, alternatively, the fourth or later timing pulse could be effective to commence a document interchange operation, rather than the third pulse as indicated in FIG. 7.

The rotation of shaft 38 is terminated after one revolution thereof, provided a document has actually been transported to the paper stop position thereby interrupting the light from source 298, and at 235° of the third machine cycle shaft 148 (see FIG. 4B) is then operated to cause a document interchange operation in accordance with the timing shown in FIG. 7. Thereafter, the document remains secured to read drum 12 by the combination of mechanical and vacuum means until such time as the next end of read signal is supplied by the character recognition system.

What has been described is an improved document transport apparatus which is particularly adaptable for use with a character recognition system.

It will thus be seen that the objects set forth above, among those made apparent from the preceding description are efficiently attained, and since certain changes may be made in the above construction without departing from the scope of the invention, it is intended that all matter contained in the above description or shown in the accompanying drawing shall be interpreted as illustrative and not in a limiting sense.

What is claimed is:

1. A document transport apparatus adapted for use with, and controlled by, a character recognition system comprising, (a) means for retaining a supply of documents, each

11 of said documents having at least one dimension in common, (b) first vacuum means selectively operable to deliver a single document from said retaining means to a further station including a feed drum having a plurality of parallel slots arranged about a portion of the outer periphery thereof, first means selectively operable to impart a single cycle of oscillatory motion to said feed drum, second means controlled primarily by said first means and secondarily by said oscillatory motion of said feed drum to couple a vacuum source to all of said slots during a predetermined portion of said cycle to thereby attach one of said documents to said feed drum, and stripper and roller means cooperating with said drum to remove said attached document from said drum and thereafter deliver said document to said further station;

(c) a continuously rotating read drum including mechanical and second vacuum means in combination for maintaining a document in contact with the outer surface thereof; and (d) third means selectively operable for transporting said document from said further station to said read drum; and (e) means for sensing the presence and absence of a document at said further station, the sensing of the presence of a document being effective to inhibit said first means and the absence of a document being effective to inhibit said third means.

2. The apparatus of claim 1 wherein said last named means is further operable in response to both the absence of a document at said further station and the absence of any document in said retaining means to also remove a preceding document from said drum.

3. A document transport apparatus comprising,
(a) means for retaining a supply of documents, each of said documents having at least one dimension in common,
(b) a read drum;
(c) means for supplying continuous rotary motion to said read drum;
(d) a feed drum;
(e) first means selectively operable to impart a single cycle of oscillatory motion to said feed drum;
(f) second means controlled by said first means operable to couple a suction means to said feed drum during a predetermined portion of said cycle to thereby attach one of said documents to said drum;
(g) means cooperating with said feed drum to remove said attached document from said drum and thereafter deliver said document to a further station;
(h) third means selectively operable to transport said document from said further station to said read drum;
(i) means operable to retain said document entirely in contact with the outer surface of said read drum, said last named means including suction means and mechanical means in combination; and
(j) said mechanical means including a plurality of gripper fingers normally contacting said outer surface of said drum, means operable during a predetermined portion of each cycle of rotation of said read drum to first release said gripper fingers from contacting said surface and thereafter restore said contacting, and means selectively operable to inhibit said last named means.

4. A document transport apparatus comprising,
(a) means for retaining a supply of documents, each of said documents having at least one dimension in common,
(b) a read drum;
(c) means for supplying continuous rotary motion to said read drum;
(d) a feed drum;
(e) first means selectively operable to impart a single cycle of oscillatory motion to said feed drum;

12

(f) second means controlled by said first means operable to couple a suction means to said feed drum during a predetermined portion of said cycle to thereby attach one of said documents to said drum;
(g) means cooperating with said feed drum to remove said attached document from said drum and thereafter deliver said document to a further station;
(h) third means selectively operable to transport said document from said further station to said read drum;
(i) means operable to retain said document entirely in contact with the outer surface of said read drum, said last named means including suction means and mechanical means in combination; and
(j) means for sensing the presence and absence of a document at said further station, the sensing of the presence of a document being effective to inhibit said first means and the absence of a document being effective to inhibit said third means except when the supply of documents in said retaining means is exhausted.

5. A document transport apparatus adapted for use with, and controlled by, a character recognition system comprising,
(a) means for retaining a supply of documents, each of said documents having at least one dimension in common;
(b) first vacuum means selectively operable by said character recognition system to feed one of said documents from said retaining means to a further station;
(c) a continuously rotating read drum including mechanical and second vacuum means in combination for maintaining a document in contact with the outer surface thereof;
(d) means responsive to the presence of a document at said further station for transporting said document to said drum and removing a preceding document from said drum each during a predetermined portion of a single cycle of rotation of said drum; and
(e) said last named means being further operable in response to both the absence of a document at said further station and the absence of any document in said retaining means to also remove a preceding document from said drum.

6. The apparatus of claim 5 wherein said last named means includes means to operate said mechanical means comprising,
(a) a plurality of gripper fingers normally contracting said outer surface of said read drum;
(b) means selectively operable to impart to said fingers two directions of motion in sequence, a first of said motions being perpendicular to said outer surface and the second of said motions being pivoted about an axis, whereby the alignment of a document attracted to said outer surface by said second vacuum means is not disturbed by said mechanical means.

7. The apparatus of claim 5 wherein said first vacuum means comprises,
(a) a feed drum;
(b) said feed drum including a plurality of parallel slots, each of said slots including an aperture and a recessed portion, said aperture connected to a coupling means; and
(c) said coupling means connecting said aperture to a suction means and atmospheric pressure, alternatively.

8. The apparatus of claim 7 wherein said recessed portion exhibits a constant depth throughout its entire length.

9. The apparatus of claim 7 wherein said recessed portion is tapered.

10. A document transport apparatus adapted for use with, and controlled by, a character recognition system comprising, (a) means for retaining a supply of documents, each of said documents having at least one dimension in common;

(b) first vacuum means selectively operable by said character recognition system to feed one of said documents from said retaining means to a further station;

(c) a continuously rotating read drum including mechanical and second vacuum means in combination for maintaining a document in contact with the outer surface thereof, said second vacuum means including a plurality of apertures spaced about said outer surface of said read drum, means coupling all of said apertures to a suction means, each of said apertures comprising first and second sections, said first section being a recessed area in said outer portion having a first diameter and said second section being an orifice connected thereto having a second diameter, said first diameter being greater than said second diameter whereby each of said apertures applies said suction means to a document and alternatively reduces the coupling of said suction means to atmospheric pressure in accordance with the ratio of second to first diameters; and (d) means responsive to the presence of a document at said further station for transporting said document to said drum and removing a preceding document from said drum each during a predetermined portion of a single cycle of rotation of said drum.

References Cited in the file of this patent

UNITED STATES PATENTS

| | | |
|---|---|---|
| Re. 20,862 | Harrold | Sept. 20, 1938 |
| 1,107,254 | Blackford | Aug. 18, 1914 |
| 2,965,019 | Hayes et al. | Dec. 20, 1960 |